(12) United States Patent
Hartness et al.

(10) Patent No.: US 7,191,896 B2
(45) Date of Patent: *Mar. 20, 2007

(54) SPIRAL ACCUMULATOR APPARATUS

(75) Inventors: Thomas P. Hartness, Greenville, SC (US); Robert C. Beesley, Greenville, SC (US); Marc Monaghan, Greenville, SC (US)

(73) Assignee: Hartness International, Inc., Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/409,765

(22) Filed: Apr. 24, 2006

(65) Prior Publication Data

US 2006/0185962 A1 Aug. 24, 2006

Related U.S. Application Data

(63) Continuation of application No. 10/817,447, filed on Apr. 2, 2004, now Pat. No. 7,032,742.

(51) Int. Cl.
*B65G 37/00* (2006.01)
(52) U.S. Cl. ............... 198/594; 198/444; 198/812; 198/347.3
(58) Field of Classification Search ............ 198/594, 198/347.3, 444, 812
See application file for complete search history.

(56) References Cited

U.S. PATENT DOCUMENTS 3,318,439 A * 5/1967 Sullivan ............. 198/347.1
3,682,295 A 8/1972 Roinestad (Continued)

FOREIGN PATENT DOCUMENTS

CA 2364216 A1 6/2003

(Continued)

OTHER PUBLICATIONS

Int'l Search Report and Written Opinion for PCT/US2004/037232, Feb. 10, 2005.

*Primary Examiner*—Douglas Hess
(74) *Attorney, Agent, or Firm*—Dority & Manning, P.A.

(57) ABSTRACT

A spiral accumulator apparatus is disclosed for controlling the flow of articles. The apparatus includes an infeed conveyor driven in a first direction to convey articles therealong in the first direction along a first path that is at least partially curved, and an outfeed conveyor driven in an opposite direction to convey articles therealong in the opposite direction along a second path that is at least partially curved. The infeed and outfeed conveyors are spaced apart and generally parallel along at least a portion of the first and second paths so as to define a space therebetween. A movable transport member is disposed generally across and movable along the space, and an article transfer member is carried by the transport member and operably disposed between the infeed and outfeed conveyors to transfer articles between the infeed conveyor and the outfeed conveyor. A transport member mover is connected to the transport member, the transport member mover including an endless loop movable when a relative speed difference exists between the infeed and outfeed conveyors thereby causing the transport member to travel in the direction of the faster of the infeed and outfeed conveyors. Various options and modifications are possible, including use of a differential drive mechanism of mechanical, gear-based, or sensor and controller based designs.

16 Claims, 9 Drawing Sheets

U.S. PATENT DOCUMENTS

| | | | |
|---|---|---|---|
| 4,018,325 A | 4/1977 | Rejsa | |
| 4,063,632 A | 12/1977 | Neth et al. | |
| 4,201,286 A | 5/1980 | Meier | |
| 4,364,465 A | 12/1982 | Kraft et al. | |
| 4,401,020 A | 8/1983 | Brux | |
| 4,413,724 A | 11/1983 | Fellner | |
| 4,469,219 A | 9/1984 | Cosse | |
| 4,513,858 A | 4/1985 | Fellner et al. | |
| 4,549,647 A | 10/1985 | Cosse | |
| 4,718,656 A | 1/1988 | Reist | |
| 4,863,010 A | 9/1989 | Proksa et al. | |
| 4,944,315 A | 7/1990 | Focke | |
| 4,989,718 A | 2/1991 | Steeber | |
| 5,067,857 A | 11/1991 | Ward | |
| 5,267,821 A | 12/1993 | Bodart et al. | |
| 5,277,294 A | 1/1994 | Sherepa et al. | |
| 5,282,525 A | 2/1994 | Covert | |
| 5,335,780 A | 8/1994 | Watson | |
| 5,350,050 A | 9/1994 | Franke | |
| 5,413,213 A * | 5/1995 | Golz et al. | 198/778 |
| 5,490,589 A * | 2/1996 | Golz et al. | 198/444 |
| 5,690,463 A | 11/1997 | Yoshie | |
| 5,722,655 A | 3/1998 | Reist | |
| 5,772,005 A * | 6/1998 | Hansch | 198/594 |
| 6,026,947 A | 2/2000 | Persson | |
| 6,152,291 A * | 11/2000 | Steeber et al. | 198/594 |
| 6,168,005 B1 | 1/2001 | Petrovic | |
| 6,182,812 B1 | 2/2001 | Hartness | |
| 6,230,874 B1 * | 5/2001 | Steeber et al. | 198/602 |
| 6,260,688 B1 * | 7/2001 | Steeber et al. | 198/347.4 |
| 6,334,528 B1 | 1/2002 | Bogle et al. | |
| 6,382,398 B2 | 5/2002 | Steeber et al. | |
| 6,497,321 B2 | 12/2002 | Horton et al. | |
| 6,523,669 B1 | 2/2003 | Steeber et al. | |
| 6,533,103 B2 | 3/2003 | Hartness et al. | |
| 6,550,602 B2 | 4/2003 | Steeber et al. | |
| 6,585,104 B2 | 7/2003 | Horton et al. | |
| 6,591,963 B2 | 7/2003 | Wipf | |
| 6,612,420 B1 * | 9/2003 | Hartness et al. | 198/597 |
| 6,698,581 B2 | 3/2004 | Steeber et al. | |
| 6,725,998 B2 | 4/2004 | Steeber et al. | |
| 6,817,464 B2 | 11/2004 | Biondi et al. | |
| 6,848,563 B2 | 2/2005 | Abert et al. | |
| 7,032,742 B2 * | 4/2006 | Hartness et al. | 198/594 |

FOREIGN PATENT DOCUMENTS

| | | |
|---|---|---|
| DE | 1262886 | 3/1968 |
| DE | 2618905 | 11/1977 |
| DE | 19856649 A1 | 6/2000 |
| FR | 2583394 A1 | 6/1985 |
| GB | 0831911 | 9/1957 |
| JO | H5262423 | 10/1993 |
| JP | S567805 | 1/1981 |
| JP | S5953315 | 3/1984 |
| JP | H5286552 | 11/1993 |

* cited by examiner

SPIRAL ACCUMULATOR APPARATUS

CROSS REFERENCE TO RELATED APPLICATIONS

The present application claims priority to and is a continuation application of application Ser. No. 10/817,447, filed on Apr. 2, 2004now U.S. Pat. No. 7,032,74, which is incorporated herein by reference in its entirety.

FIELD OF THE INVENTION

The present invention relates generally to a spiral accumulator apparatus for controlling the flow of articles from an upstream delivery station to a downstream receiving station; and more particularly to an apparatus including an article transfer member moved via an endless loop movable upon difference in speed between infeed and outfeed conveyors.

BACKGROUND OF THE INVENTION

Accumulators have been utilized between an upstream delivery station and a downstream receiving station to accumulate articles when the capacity of the downstream receiving station is either shut down or run at a speed wherein it cannot handle the number of articles being fed by the upstream delivery station. One particular accumulator is disclosed in U.S. Pat. No. 4,018,325. One problem with such accumulators is that the last article fed into the accumulator is the first article fed out of the accumulator and, as a result, it is difficult to keep track of the batch from which a particular article came from, and the sequence in which the articles are fed from the upstream delivery station.

Accumulators have been made wherein the first article in is the first article out. Such "first in, first out" accumulators are sometimes known as "FIFO" accumulators. For example, the owner of the present application is also owner of U.S. Pat. Nos. 6,152,291, 6,182,812, 6,230,874, 6,260,688, 6,382,398, 6,497,321, 6,523,669, 6,533,103, 6,550,602, 6,585,104, and 6,612,420, all disclosing various aspects of FIFO conveyors, and all incorporated by references herein for all purposes.

Various of the above patents disclose accumulators having conveyors extending along multi-level curved paths, with a transfer mechanism disposed between the conveyors for transferring the conveyed objects between the conveyors. Such accumulators are commonly called spiral accumulators. As disclosed, the transfer mechanisms of such spiral accumulators may be driven by rotatable members which contact the oppositely moving conveyors (or attachments thereto) at the point of transfer. The rotatable members travel with the transfer mechanism along the conveyors, at a position dictated by the relative speeds of the conveyors.

SUMMARY OF THE INVENTION

According to some aspects of the invention, a spiral accumulator apparatus is disclosed for controlling the flow of articles. The accumulator includes a support structure, an infeed conveyor mounted to the support structure and driven in a first direction to convey articles therealong in the first direction along a first path that is at least partially curved, and an outfeed conveyor mounted to the support structure and driven in an opposite direction to convey articles therealong in the opposite direction along a second path that is at least partially curved. The infeed and outfeed conveyors are spaced apart and generally parallel along at least a portion of the first and second paths so as to define a space therebetween. A track is mounted to the support structure along at least a portion of the space, and a movable transport member is disposed generally across and movable along the space on the track. An article transfer member is carried by the transport member and operably disposed between the infeed and outfeed conveyors to transfer articles between the infeed conveyor and the outfeed conveyor. A transport member mover is connected to the transport member, the transport member mover including an endless loop. A differential drive mechanism is located at a fixed position spaced from the transport member. The differential drive mechanism includes an output portion for contacting and moving the transport member mover when a relative speed difference exists between the infeed and outfeed conveyors thereby causing the transport member to travel in the direction of the faster of the infeed and outfeed conveyors. Various options and alternatives are also available.

For example, if desired, the endless loop may be a belt, a cable, or any equivalent. The differential drive mechanism may include a plurality of gears. If so, the plurality of gears may include two input gears and a differential gear, one of the input gears being attached to an axle rotating at a speed related to that of the infeed conveyor and the other of the input gears being attached to an axle rotating at a speed related to that of the outfeed conveyor, the differential gear being driven by the two input gears so as to drive the output portion of the differential drive mechanism.

The differential drive mechanism may be operatively interconnected with axles driven by the infeed and outfeed conveyors. Also, the differential drive mechanism may include condition responsive devices for detecting directly or indirectly a speed of the infeed and outfeed conveyors, a motor, and a drive control for driving the motor based on the speeds of the infeed and outfeed conveyors so as to move the output portion of the differential drive mechanism at a desired speed.

Guide members may be mounted to the support structure for guiding the transport member mover, and the guide members may include geared or grooved pulleys and/or idler rollers.

The differential drive mechanism may drive the transport member mover at a speed equal to half the difference between the speeds of the infeed and outfeed conveyors. Also, the differential drive mechanism may drive the transport member mover at a speed proportional to $as_1 - bs_2$, where $s_1$ is the speed of the infeed conveyor and $s_2$ is the speed of the outfeed conveyor, and a and b are adjustable parameters.

According to certain other aspects of the invention, a spiral accumulator apparatus is disclosed for controlling the flow of articles. The accumulator includes an infeed conveyor driven in a first direction to convey articles therealong in the first direction along a first path that is at least partially curved, and an outfeed conveyor driven in an opposite direction to convey articles therealong in the opposite direction along a second path that is at least partially curved. The infeed and outfeed conveyors are spaced apart and generally parallel along at least a portion of the first and second paths so as to define a space therebetween, and a movable transport member is disposed generally across and movable along the space. An article transfer member is carried by the transport member and operably disposed between the infeed and outfeed conveyors to transfer articles between the infeed conveyor and the outfeed conveyor, and a transport member mover is connected to the transport member. A differential drive mechanism is located at a fixed position spaced from the transport member, the differential drive mechanism including an output portion for contacting and moving the transport member mover when a relative speed difference exists between the infeed and outfeed conveyors thereby causing the transport member to travel in the direction of the faster of the infeed and outfeed conveyors. Various further options and alternatives are also possible with this accumulator, as above.

According to another aspect of the invention, a spiral accumulator apparatus for controlling the flow of articles is disclosed. The accumulator includes an infeed conveyor driven in a first direction to convey articles therealong in the first direction along a first path that is at least partially curved, and an outfeed conveyor driven in an opposite direction to convey articles therealong in the opposite direction along a second path that is at least partially curved. The infeed and outfeed conveyors are spaced apart and generally parallel along at least a portion of the first and second paths so as to define a space therebetween. A movable transport member is disposed generally across and movable along the space, and an article transfer member is carried by the transport member and operably disposed between the infeed and outfeed conveyors to transfer articles between the infeed conveyor and the outfeed conveyor. A transport member mover is connected to the transport member. A differential drive mechanism is located at a fixed position spaced from the transport member. The differential drive mechanism includes two input gears and a differential gear, one of the input gears being attached to an axle rotating at a speed related to that of the infeed conveyor and the other of the input gears being attached to an axle rotating at a speed related to that of the outfeed conveyor, the differential gear being driven by the two input gears so as to drive an output portion of the differential drive mechanism. The output portion contacts and moves the transport member mover when a relative speed difference exists between the infeed and outfeed conveyors thereby causing the transport member to travel in the direction of the faster of the infeed and outfeed conveyors. Again, various options and modifications are possible with this accumulator, as above.

According to other aspects of the invention, a spiral accumulator apparatus is disclosed for controlling the flow of articles. The apparatus comprises an infeed conveyor driven in a first direction to convey articles therealong in the first direction along a first path that is at least partially curved, and an outfeed conveyor driven in an opposite direction to convey articles therealong in the opposite direction along a second path that is at least partially curved. The infeed and outfeed conveyors are spaced apart and generally parallel along at least a portion of the first and second paths so as to define a space therebetween. A movable transport member is disposed generally across and movable along the space. An article transfer member is carried by the transport member and is operably disposed between the infeed and outfeed conveyors to transfer articles between the infeed conveyor and the outfeed conveyor. A transport member mover is connected to the transport member, the transport member mover including an endless loop movable when a relative speed difference exists between the infeed and outfeed conveyors thereby causing the transport member to travel in the direction of the faster of the infeed and outfeed conveyors. As above, various options and modifications are possible.

For example, the endless loop could be a belt or a cable. Further, the transport member mover may be driven via a differential drive mechanism. The differential drive mechanism could include a plurality of gears, and the plurality of gears could include two input gears and a differential gear, one of the input gears being attached to an axle rotating at a speed related to that of the infeed conveyor and the other of the input gears being attached to an axle rotating at a speed related to that of the outfeed conveyor, the differential gear being driven by the two input gears so as to drive the output portion of the differential drive mechanism. The differential drive mechanism could be operatively interconnected with axles driven by the infeed and outfeed conveyors.

The differential drive mechanism could include condition responsive devices for detecting directly or indirectly a speed of the infeed and outfeed conveyors, a motor, and a drive control for driving the motor based on the speeds of the infeed and outfeed conveyors so as to move the output portion of the differential drive mechanism at a desired speed. Also, the differential drive mechanism could drive the transport member mover at a speed equal to half the difference between the speeds of the infeed and outfeed conveyors, and the differential drive mechanism may drive the transport member mover at a speed proportional to $as_1-bs_2$, where $s_1$ is the speed of the infeed conveyor and $s_2$ is the speed of the outfeed conveyor, and a and b are adjustable parameters.

The apparatus could further include a support structure, the infeed and outfeed conveyors being mounted to the support structure, and further including a track mounted to the support structure and located at least partially in the space between the infeed and outfeed conveyors, the transport member being movable along the track. Guide members could be mounted to the support structure for guiding the transport member mover and guide members could include one of pulleys or idler rollers.

The infeed and outfeed conveyors could be configured to convey the articles in a first in, first out sequence, in either a single file orientation or a greater than single file orientation.

DETAILED DESCRIPTION OF THE PREFERRED EMBODIMENTS

Referring to FIGS. 1–4, there is broadly illustrated an apparatus 10 for controlling the flow of articles A from an upstream delivery station to 12 a downstream receiving station 14. The articles are carried on a main conveyor 16 that is driven by any conventional conveyor drive mechanism. The articles are fed along the main feed conveyor 16 until they reach apparatus 10, at which point they exit conveyor 16 and enter apparatus 10. Eventually, the articles are returned to main conveyor 16 in a FIFO sequence.

Figure 1:
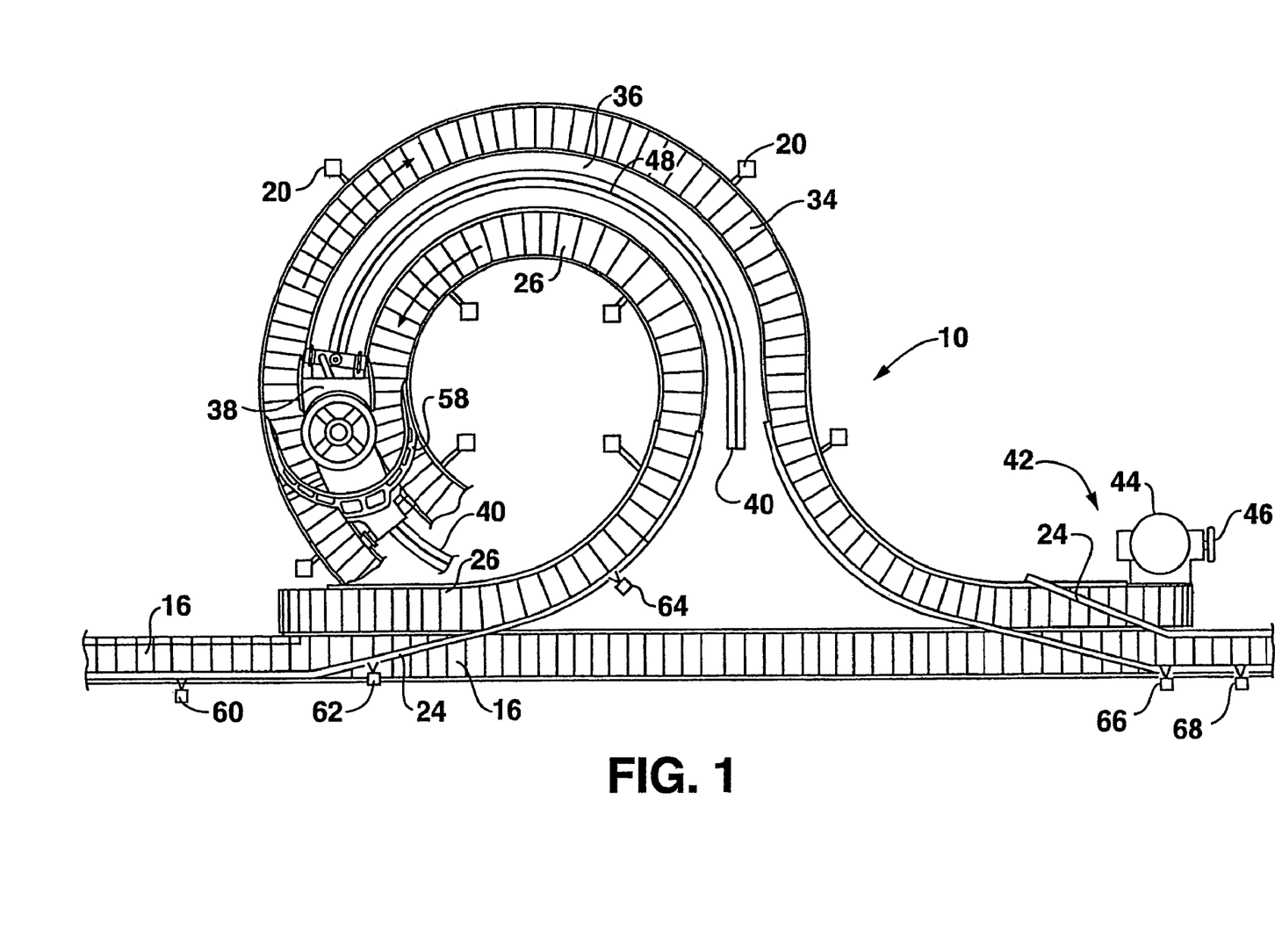
FIG. 1 is a plan view illustrating an apparatus for controlling the flow of articles in its basic form.
Figure 2:
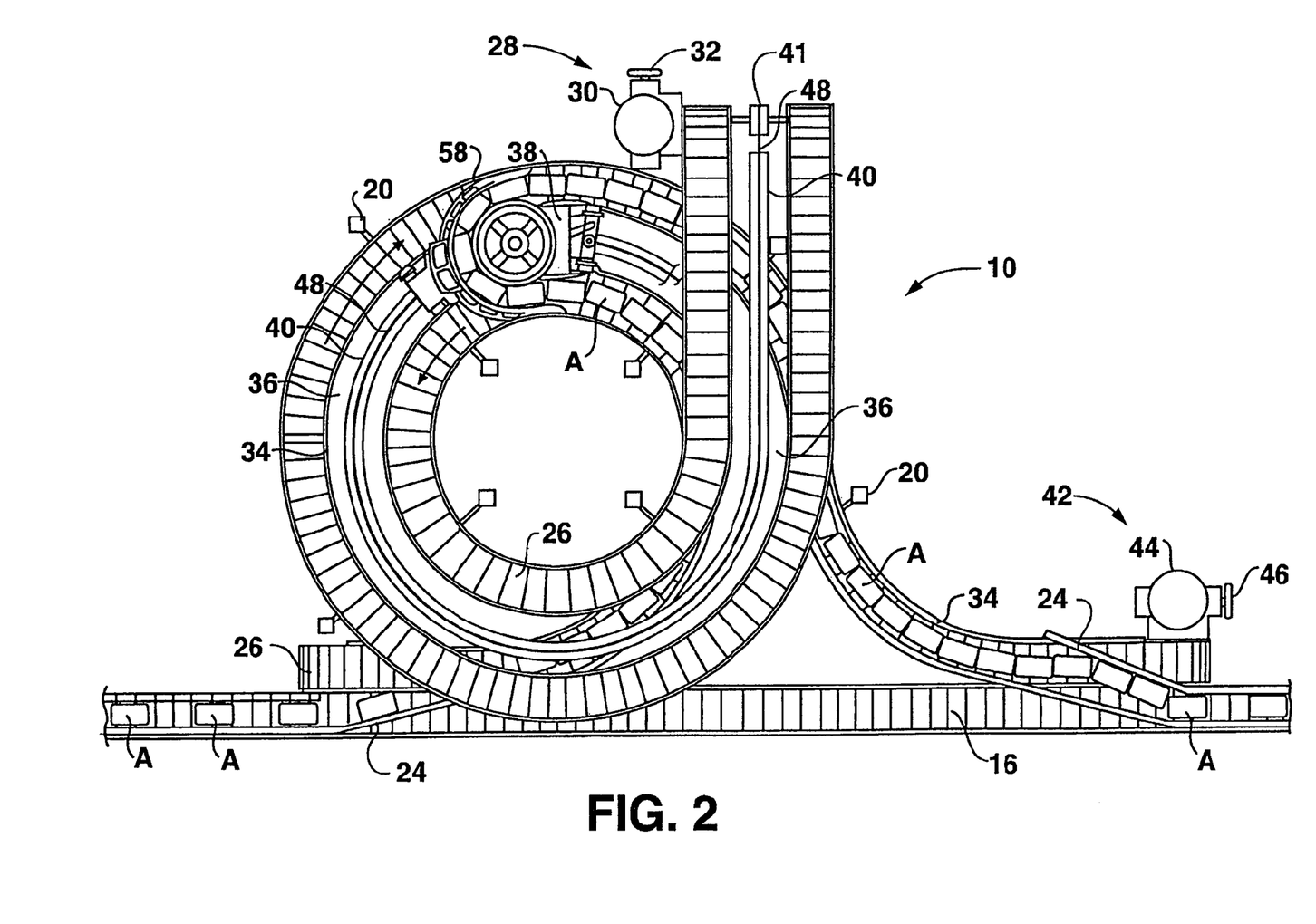
FIG. 2 is a plan view of the apparatus of FIG. 1 showing articles being loaded into the apparatus.
Figure 3:
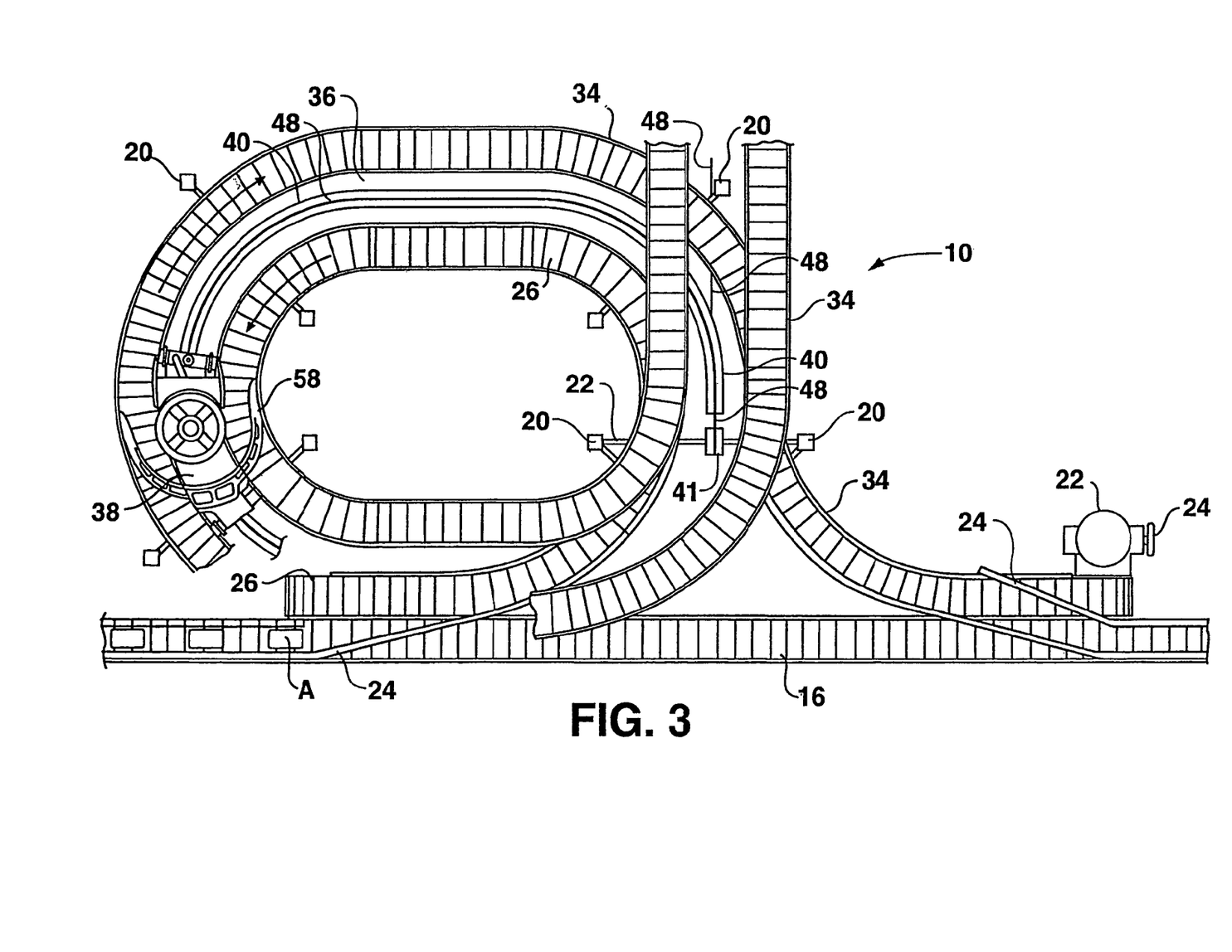
FIG. 3 is a plan view of a modified form of the design of FIG. 1.

Apparatus 10 includes a support structure 18 that, as shown, may include various vertical members 20 and horizontal members 22. The layout of support structure 18 may take any desired form depending on the size of and application for apparatus 10. Thus, support structure 18 shown herein is merely an example, and any modifications to that shown should be considered as within the scope of the present invention. FIGS. 1–3 show only vertical members 20 of support structure for clarity.

Apparatus 10 includes a deflecting rail 24 for deflecting articles A off the main conveyor 16 onto an infeed conveyor 26 carried on support structure 18. Infeed conveyor 26 is an endless conveyor and is driven by an infeed drive mechanism 28, which may include a variable speed motor 30 and a motor control 32.

An outfeed conveyor 34 is also carried on support structure 18. A substantial portion of the runs of the infeed and outfeed conveyors 26 and 34 are parallel to each other providing a space 36 therebetween. An outfeed drive mechanism 42, which may include a variable speed motor 44 and a motor control 46, drives the outfeed conveyor 34. A deflecting rail 24 is also located so as to deflect articles off outfeed conveyor 34 back onto main conveyor 16.

A transport member 38 rides on a track 40 carried by support structure 18 that permits the transport member to move backwards and forwards along the length of the infeed and outfeed conveyors 26 and 34. Infeed drive mechanism 28 drives infeed conveyor 26 in a first direction on one side of track 40, and outfeed drive mechanism 42 drives outfeed conveyor 34 in a second direction on the other side of the track.

A transport member mover 48 is operably connected to the transport member 38 and is driven by a differential drive mechanism 50. The transport member mover 48 may comprise an endless loop such as a belt, chain, cable, or the like, that rides in or along track 40. If desired, guide members 41 such as geared or grooved pulleys or idler rollers may be utilized to guide transport member mover 48.

Differential drive mechanism 50 is mounted to support structure 18 and is operatively engaged with infeed and outfeed conveyors 26 and 34. As will be discussed below in greater detail, differential drive mechanism includes two axles 52 and 54 joined at a differential housing 56. Axles 52 and 54 rotate respectively with infeed and outfeed conveyors 26 and 34, as a function of the speed of the conveyors. As shown, axles 52 and 54 are driven directly by contact with conveyors 26 and 34 via rollers 53 and 55. However, it would also be possible to obtain input rotation speed information from other idler or driven members, rotated by conveyors or motors, both directly or indirectly, if desired. Transport member mover 48 rotates around an output portion of housing 56 as the housing moves, dependent on the differential speeds of shafts 52 and 54, based ultimately on the conveyor speeds (see FIGS. 6–8). Accordingly, transport member 38 is driven relative to conveyors 26 and 34 along a path parallel to the conveyors, at a speed and direction depending on the relative speed of the conveyors. An article transfer member 58 is carried by transport member 38 for deflecting articles from infeed conveyor 26 to outfeed conveyor 34.

The speeds of the conveyors 26 and 34 are controlled by drive mechanisms 28 and 42. If the speed of outfeed conveyor 34 is slower than the speed of infeed conveyor 36, then transport member 38 is moved in the counter-clockwise direction (as shown in FIGS. 1–3), thereby increasing the number of articles on the surfaces of the infeed conveyor and the outfeed conveyor for temporarily storing the articles in the accumulator 10. If the speed of outfeed conveyor 34 is greater than the speed of infeed conveyor 26, transport member 38 will move in a clockwise direction (as shown in FIGS. 1–3), thereby reducing the number of articles stored on the infeed and outfeed conveyors, with FIFO sequencing.

Condition responsive devices may be positioned along the conveyors for generating signals responsive to various conditions. For example, a condition responsive device 60 may be positioned adjacent to main conveyor 16 for sensing a backup of articles on the main conveyor; and if such a condition occurs a signal may be sent to a motor control 32 which causes the motor 30 to shift to a higher speed, thereby speeding up infeed conveyor 26. The condition responsive device 60 may be any suitable conventional sensor, but in one particular embodiment it is a photocell provided with a timer so that if the photocell is activated for a certain period of time by non-movement of the article a signal is generated. The articles A carried on the main conveyor are spaced apart, and as long as the space is sensed between the articles in a given period of time then no signal is generated by the photocell to trigger an increase in speed of the infeed conveyor 26. One suitable photocell is manufactured by Sick A.G. having a part number of WT4-2P135S10. Sick A.G. is located in Wldkirch, Germany. It is to be understood that any conventional suitable condition responsive device could be used at any of the locations where one is required.

Another condition responsive device 62 may be positioned along main conveyor 16 closely adjacent to the front end of the rail 24. This device is provided to sense a backup on conveyor 16, and causes a signal to be produced to reduce the speed of conveyor 16 to a medium speed. Another condition responsive device 64 may be positioned near the entrance of infeed conveyor 26 for sensing a lack of articles on the infeed conveyor. This sensor generates a signal to the stop the infeed conveyor when such a condition occurs.

There may be still another condition responsive device 66, positioned adjacent to main conveyor 16, where the articles are fed back onto the main conveyor. When a backup of articles is sensed by condition responsive device 66 on the main conveyor 16, a signal is sent to motor control 46 to stop the outfeed conveyor 34. A backup is sensed when the articles exiting off of outfeed conveyor 34 are pressed against each other on main conveyor 16.

Under normal operation, main conveyor 16 is running at a higher speed than outfeed conveyor 34, and as the articles are transferred from the outfeed conveyor onto the main conveyor a space is developed between the articles. Condition responsive device 66 is thus provided for ensuring that this space remains between the articles, and if the space is lost as a result of a backup of articles then the outfeed conveyor 34 is stopped.

A still further condition responsive device 68 may be positioned further down the line on main conveyor 16, and when it senses that there is no space between articles being delivered back onto the main conveyor a signal is generated, which is fed to variable motor control 46 for outfeed conveyor 34, for reducing the speed of variable speed motor 44.

All of the signals generated by condition responsive devices 60-68 are fed to motor controllers 32 and 46 (or the controller for conveyor 16, not shown), which may comprise conventional controllers such as a programmable logic controller. One suitable programmable logical controller is manufactured by Allen Bradley and has a model number of SLC500 series. Allen Bradley is located in Milwaukee, Wis. Other controllers may also be utilized within the scope of the invention.

In order for transport member 38 to move from the position shown in FIG. 2 to the position shown in FIG. 1 the speed of infeed conveyor 26 must be running faster than the speed of outfeed conveyor 34. As a result, when transport member 38 is moved in a counter-clockwise direction it is loading articles from infeed conveyor 26 to outfeed conveyor 34 for storing the articles. As previously mentioned when the demand at the downstream receiving station increases then the speed of outfeed conveyor 34 will increase over the speed of infeed conveyor 26 via transport member mover 48, and the transport member will move in a clockwise direction from the position shown in FIG. 1 to the position shown in FIG. 2 to unload the articles stored in the accumulator. The configuration for the parallel run of infeed conveyor 26 and the outfeed conveyor 34 can vary depending on the amount of floor space that is desired to be utilized for the accumulator. In FIGS. 1 and 2 the configuration of the infeed and outfeed conveyors is in a spiral. In FIG. 3 the configuration of infeed conveyor 26 and outfeed conveyor 34 is also in a spiral but it has an elongated middle portion. If there is sufficient floor space the run of the two conveyors can be in a horizontal plane.

Figure 4:
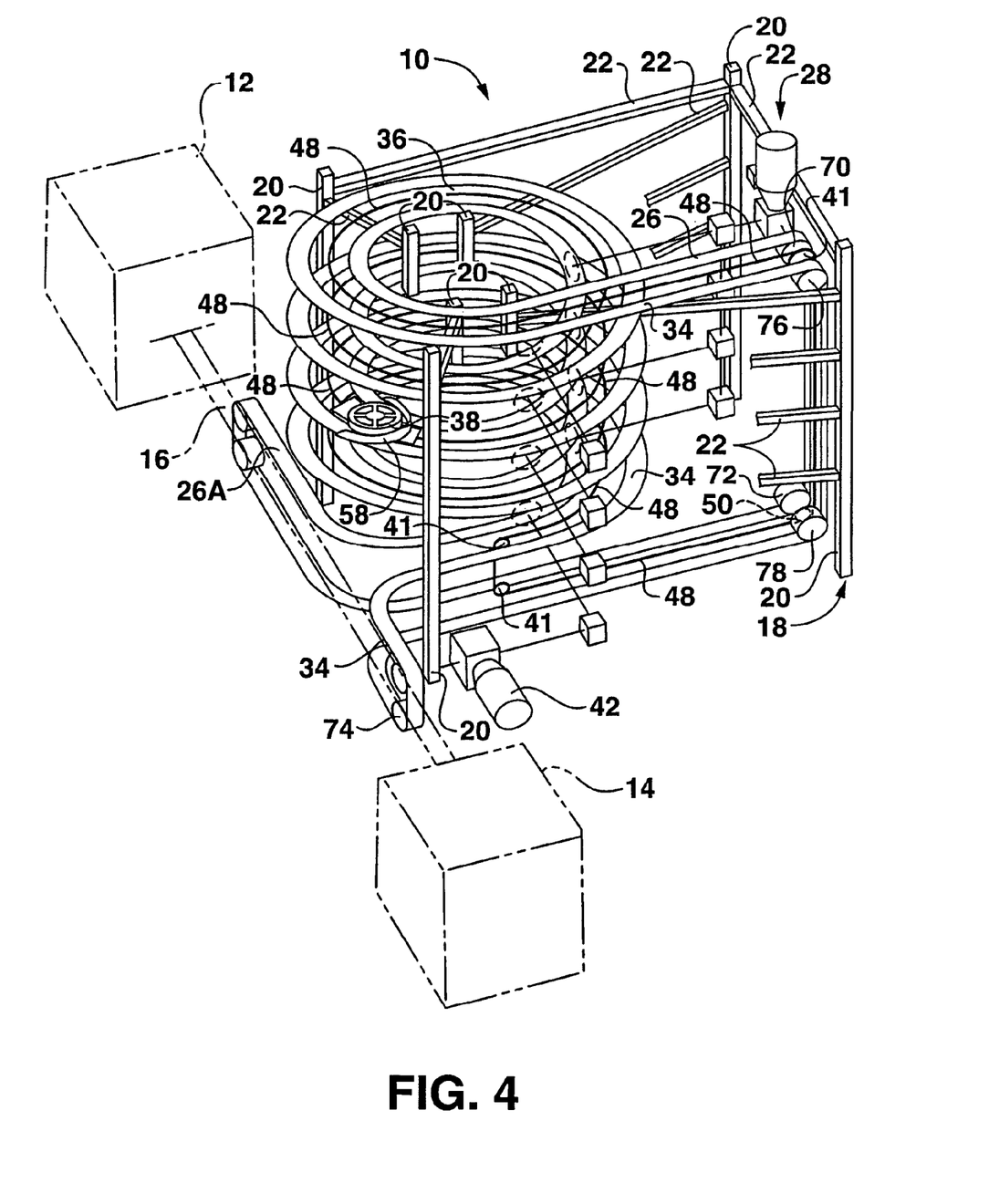
FIG. 4 is a schematic diagram illustrating an apparatus storing articles in a vertical spiral.

As shown in FIG. 4 the configuration of infeed conveyor 26 and outfeed conveyor 34 is in a vertical spiral so that a substantial amount of storage can be placed in a relatively small space. Sometimes as the height of the spiral increases it is necessary to additionally drive the infeed and outfeed conveyors along the vertical path of the spiral so as to minimize the drag of the conveyors on the track. The additional drive mechanism is shown in schematic form in FIG. 4.

Figure 5:
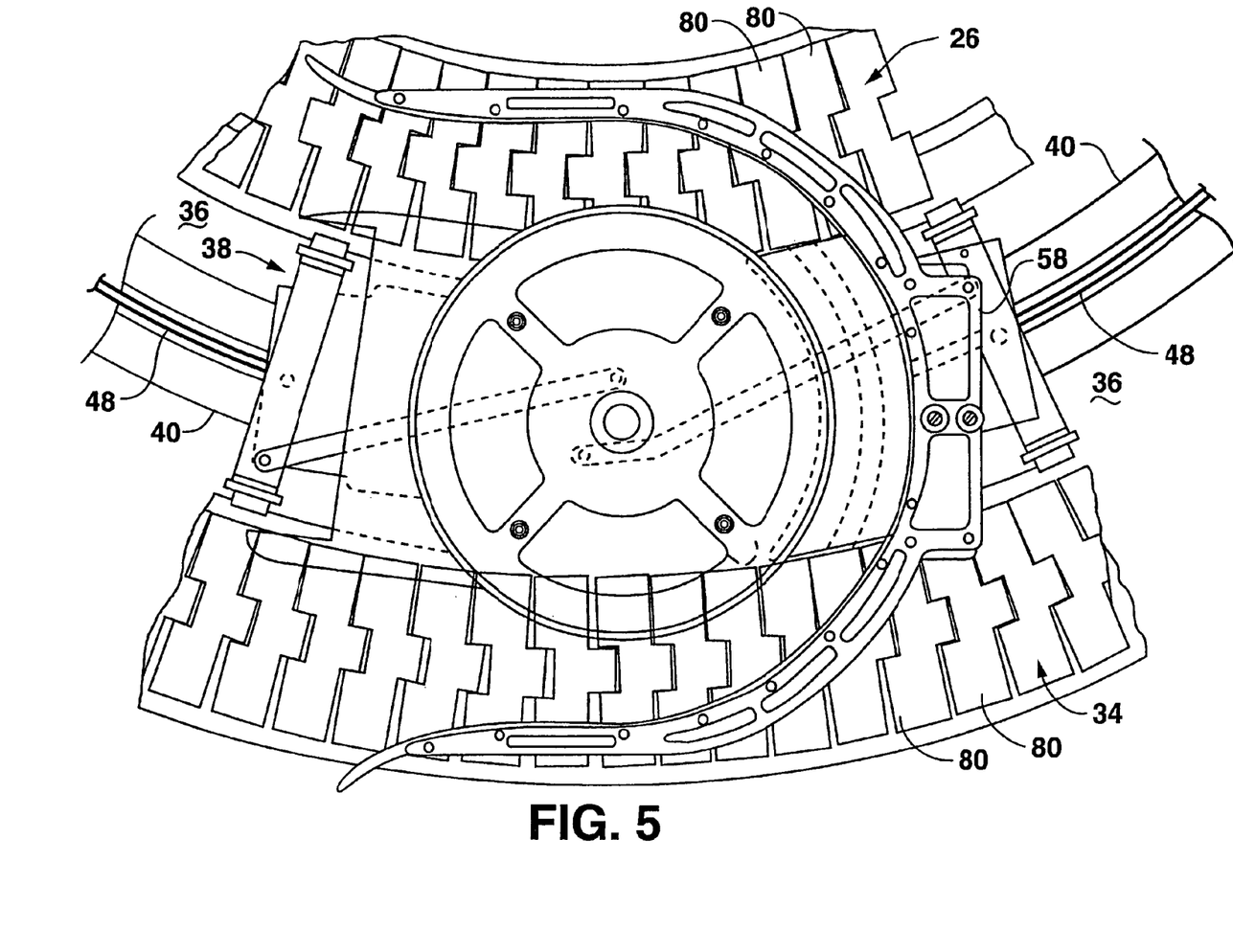
FIG. 5 is a perspective view of a transport member mounted on a track and attached to a transport member mover according to certain aspects of the invention.

As can be seen in FIG. 4 infeed conveyor 26 and outfeed conveyor 34 are endless conveyors. Infeed conveyor 26 is driven by motor 30, and its path extends upwards from adjacent main conveyor 16 in a spiral configuration to pass over a drive sprocket 70 then down a vertical run through an idle sprocket 72 and back to the track which holds the conveyor in a vertical spiral. The track (not shown) for holding the conveyor may be of any suitable construction and is supported on vertical members 20 and horizontal members 22. Outfeed conveyor 34 is driven by outfeed drive motor 44 by means of drive sprocket 74. The conveyor belt 34 passes around idle sprockets 76 and 78 in its run. Infeed conveyor 26 and outfeed conveyor 34 may be constructed of any suitable conventional chain belt that has connecting links 80, and in one particular embodiment has an upper surface such as shown in FIG. 5.

Figure 6:
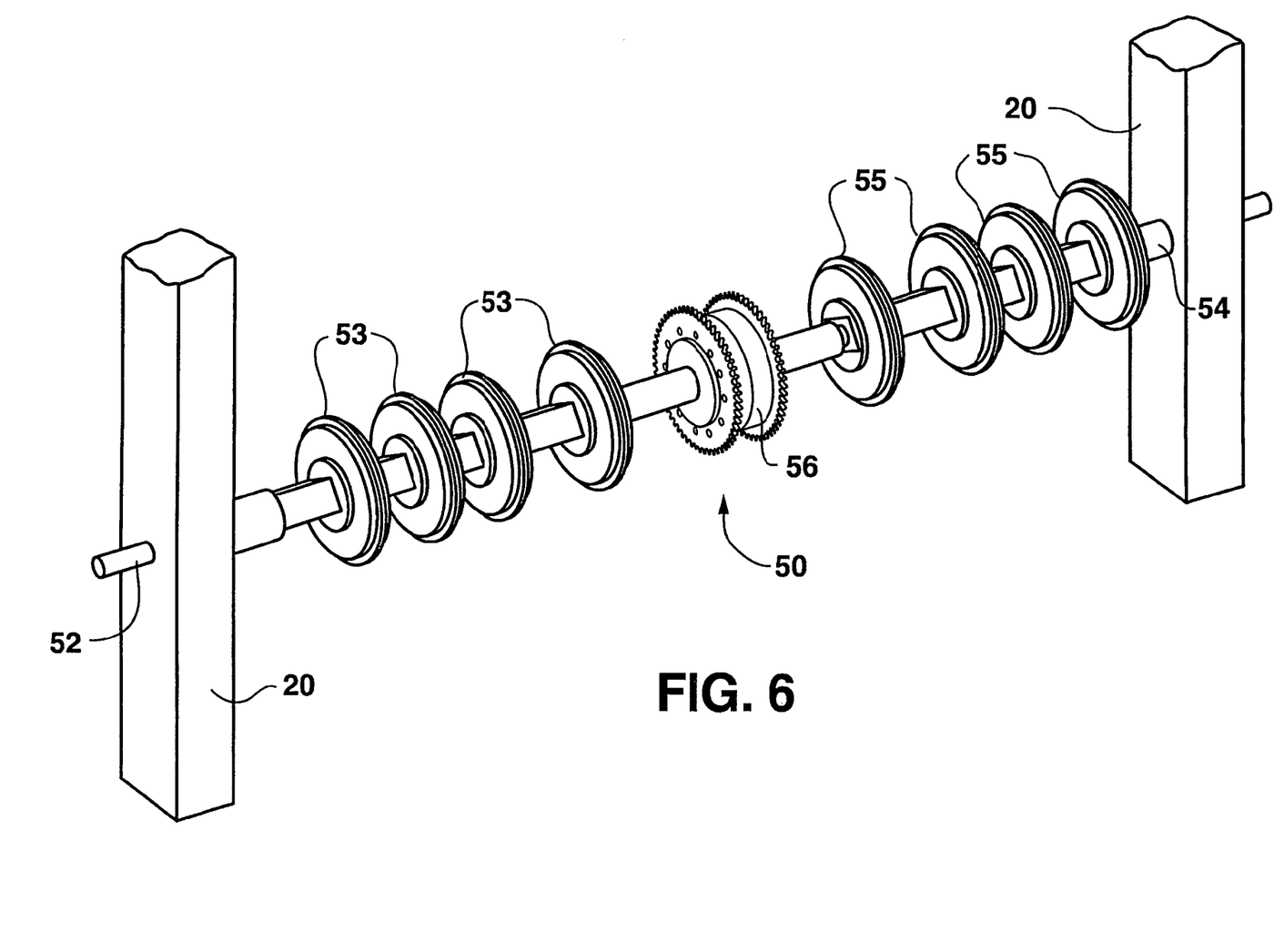
FIG. 6 is a perspective view of a differential drive mechanism according to certain aspects of the present invention.
Figure 7:
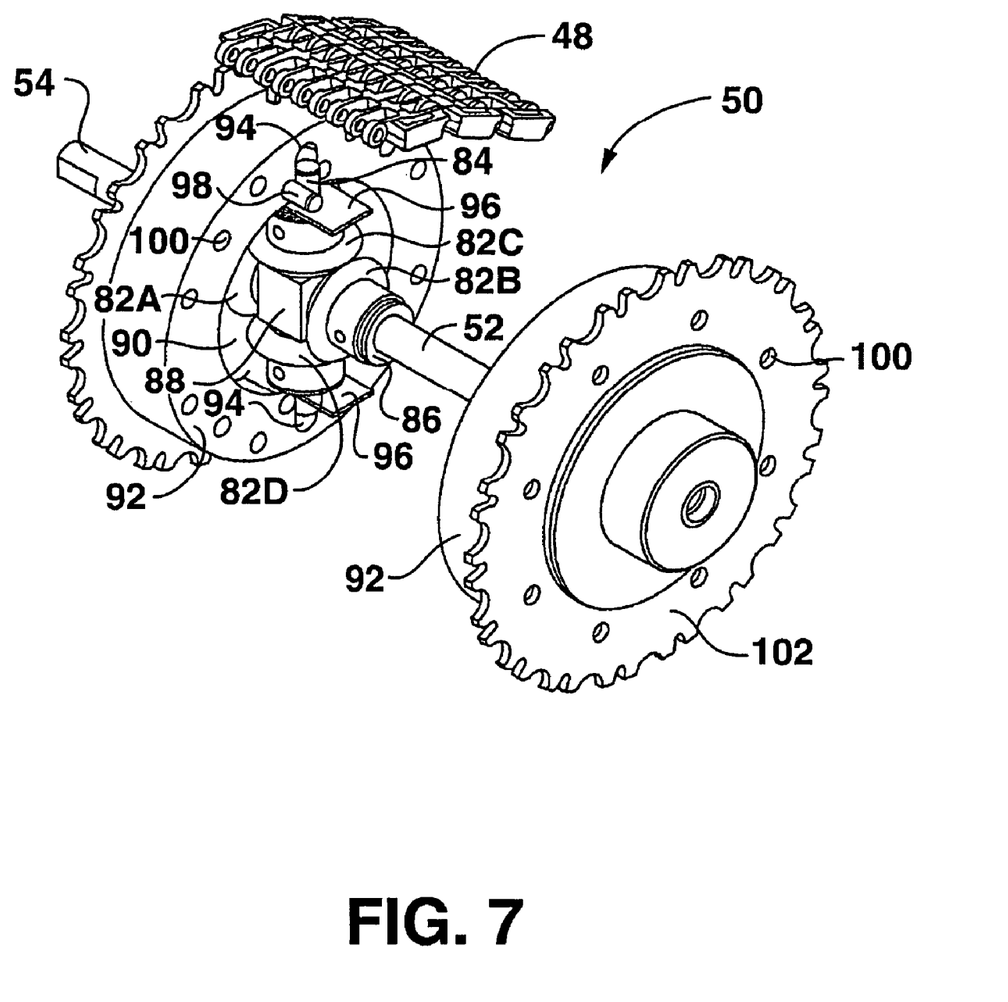
FIG. 7 is a partially exploded perspective view of the differential drive mechanism of FIG. 6.

One example of a gear-based differential drive mechanism useful with the spiral accumulator designs disclosed above is shown in more detail in FIGS. 6 and 7. As shown, the mechanism includes four bevel gears 82A-D. The outfeed axle 52, rotating (as shown) at the speed of the outfeed conveyor 34 (not shown, but traveling around rollers 53), is connected to the bevel gear 82A. The infeed axle 54, rotating (as shown) at the speed of infeed conveyor 26 (not shown, but traveling around rollers 55), is connected to opposite bevel gear 82B. The gears mesh with gears 82C and 82D, which are coaxially and rotatably aligned as pinion gears on pinion shaft 84. Couplings 86 retain the bevel gears in place on the axles and pinion shaft. The ends of pinion shaft 84 extend from a spider 88, which also provides supports for axles 52, 54. The differential mechanism fits in a hollow 90 formed in the center of two mating central housing halves 92. The ends of pinion shaft 84 fit in cavities 94 formed radially in the housing halves. Metal plates 96 serve as thrust bearings. Dowels 98 register the two housing halves, which are held together conventionally by bolts or screws through holes 100. A toothed sprocket wheel 102 is attached to each housing half. The peripheral teeth of the sprocket wheel engage a driven belt, comprising the transport member mover 48, to drive it.

The geared differential works conventionally in that relative motion of shaft output bevel gears 82A and 82B causes pinion gears 82C and 82D to rotate about the axis of axles 52, 54. As the pinion gears rotate, the ends of pinion shaft 84 cause housing 56 and sprocket wheels 102 to rotate. The speed of rotation depends on the relative speeds of the rotation of the output shaft bevel gears. In the situation where the outfeed conveyor and the infeed conveyor are moving at the same speed in opposite directions, outfeed output bevel gear 82A rotates in one direction at a certain speed and the infeed output bevel gear 82B rotates in the opposite direction at the same speed, which causes the pinion gear assembly to rest with its pinion shaft stationary. As one of the conveyors 26 or 34 speeds up relative to the other, differential drive mechanism 50 causes the housing and sprocket wheel assembly to rotate in the direction of the faster moving rotating assembly, but at half the difference between the speeds of each rotating assembly. Thus, in this example, the speed s of transport member mover 48 is given by: $s=\frac{1}{2}(s_1-s_2)$, where $s_1$ is the speed of the faster-moving belt and $s_2$ is the speed of the slower-moving conveyor. Of course, the gearing ratios can be altered by the use of gear reducers or other conventional techniques to derive other speed relationships that may be generically defined by s is proportional to $as_1-bs_2$, where a and b are parameters set by the effective gear ratios, for example. This would allow the transport member mover to be driven at a speed that is influenced relatively more by one of the conveyors than the other in special applications. Also, the ratios could be changed if the widths of the conveyors were not equal, which could be desirable in some situations.

Figure 8:
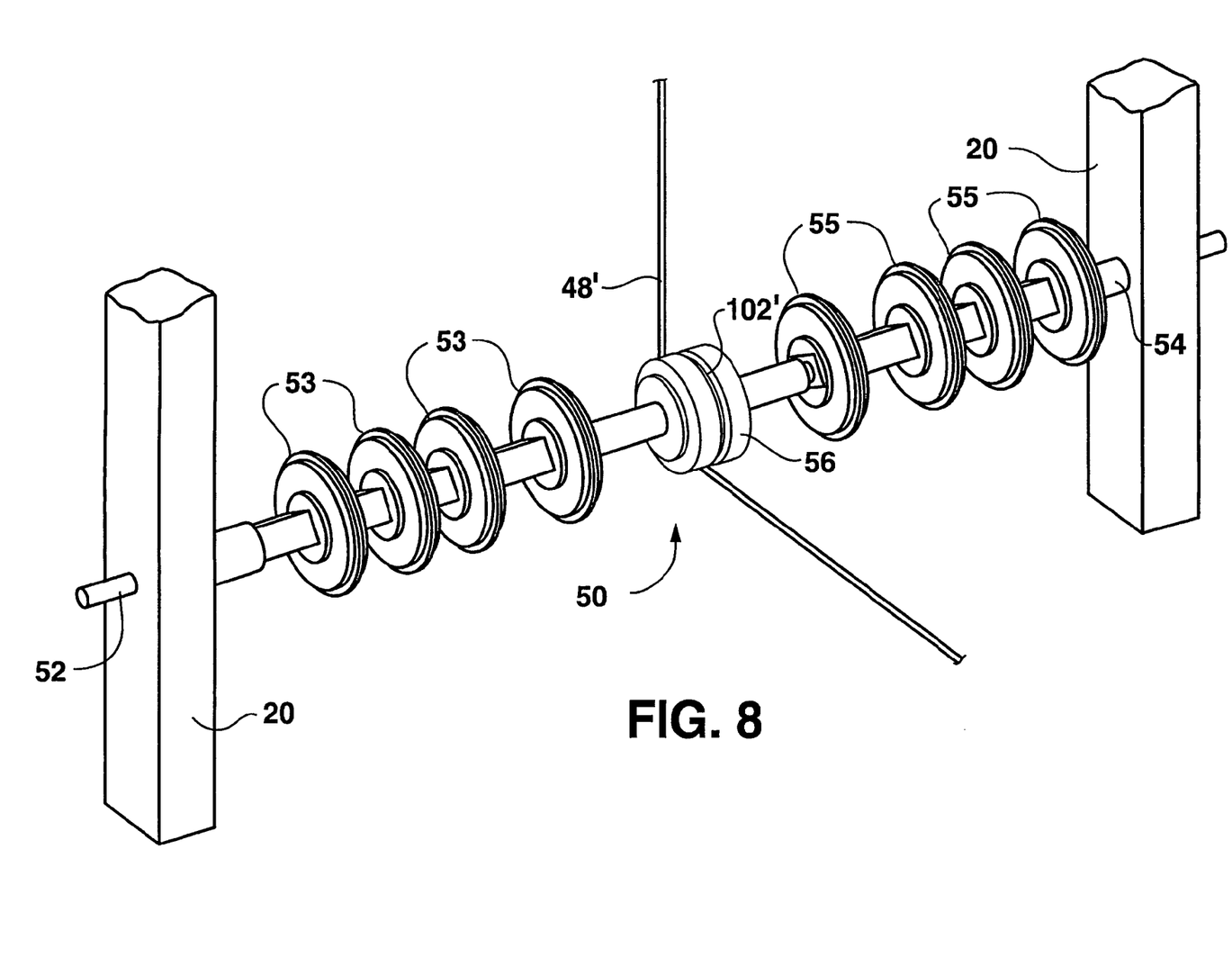
FIG. 8 is a perspective view of an alternate differential drive mechanism as in claim 6, but with cable and pulley.

As shown in FIG. 8, it would be possible to modify transport member mover 48', for example by substituting a cable for the illustrated belt. If so, members 41 could be a pulley or the like, and guide track 40 would have to also be modified accordingly. Also, housing 56 would likely be modified as well, so that the output portion driving transport member mover 48' would not necessarily be two, toothed sprocket wheels, but would comprise a groove 102' for receiving the cable. Various other modifications would also be possible to transfer differential rotational motion from a differential housing to transport member mover. It should be understood that all such modifications and options are considered to be within the scope of the invention.

Figure 9:
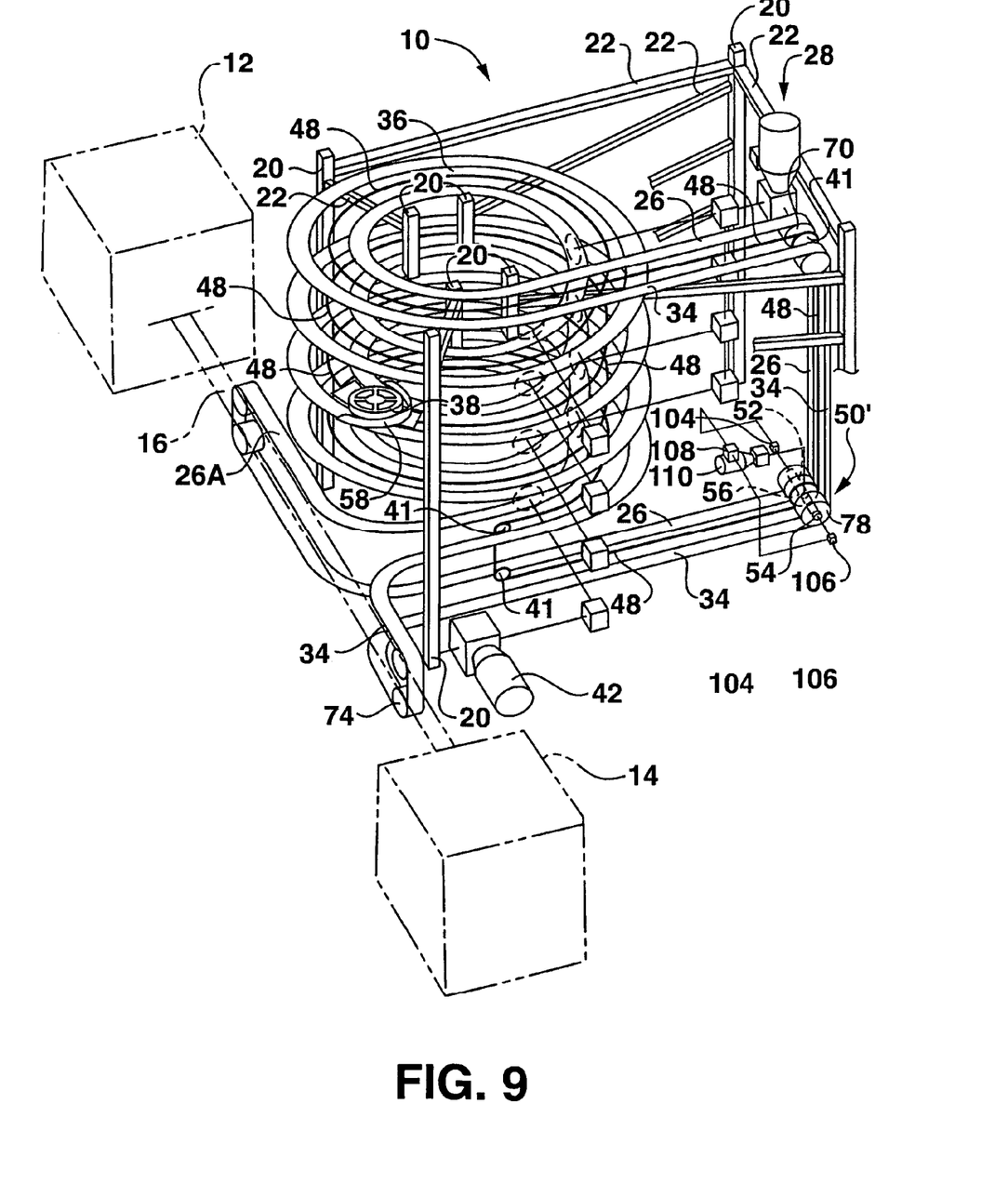
FIG. 9 is a schematic diagram of an alternate differential drive mechanism according to certain aspects of the invention.

Another example of a differential drive mechanism useful with the above spiral accumulators is shown diagrammatically in FIG. 9. As shown, differential drive 50' includes a housing 56' disposed between conveyors 26 and 34 for driving transport member mover 48. As shown, transport member mover 48 is a cable but, as above other structures could be used with suitable corresponding modifications. Condition responsive devices such as an infeed conveyor speed sensor 104 and an outfeed conveyor speed sensor 106 are also provided. As shown schematically in FIG. 9, sensors 104 and 106 may measure the rotational speed of axles 52 and 54 directly, or in another way such as via related rotational axles or via differential housing 56'. Accordingly, sensors 104 and 106 may comprise optical or mechanical transducers or the like. Alternatively, sensors 104 and 106 could directly measure the speed of conveyors 26 or 34. Sensors 104 and 106 are in communication with a motor controller 108 that drives a motor 110 depending on the sensed speeds. Controller 108 can use logic, along the lines described above, to determine an output speed and direction for housing 56' and can drive motor 110 accordingly. Controller 108 may be a programmable logic controller, as described above.

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. While particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

What is claimed is:

1. A spiral accumulator apparatus for controlling the flow of articles, comprising:
   an infeed conveyor driven in a first direction to convey articles therealong in the first direction along a first path that is at least partially curved;
   an outfeed conveyor driven in an opposite direction to convey articles therealong in the opposite direction along a second path that is at least partially curved;
   the infeed and outfeed conveyors being spaced apart and generally parallel along at least a portion of the first and second paths so as to define a space therebetween;
   a movable transport member disposed generally across and movable along the space;
   an article transfer member carried by the transport member and operably disposed between the infeed and outfeed conveyors to transfer articles between the infeed conveyor and the outfeed conveyor; and
   a transport member mover connected to the transport member, the transport member mover including an endless loop movable when a relative speed difference exists between the infeed and outfeed conveyors thereby causing the transport member to travel in the direction of the faster of the infeed and outfeed conveyors.

2. The apparatus of claim 1, wherein the endless loop is a belt.

3. The apparatus of claim 1, wherein the endless loop is a cable.

4. The apparatus of claim 1, wherein the transport member mover is driven via a differential drive mechanism.

5. The apparatus of claim 4, wherein the differential drive mechanism includes a plurality of gears.

6. The apparatus of claim 5, wherein the plurality of gears includes two input gears and a differential gear, one of the input gears being attached to an axle rotating at a speed related to that of the infeed conveyor and the other of the input gears being attached to an axle rotating at a speed related to that of the outfeed conveyor, the differential gear being driven by the two input gears so as to drive the output portion of the differential drive mechanism.

7. The apparatus of claim 4, wherein the differential drive mechanism is operatively interconnected with axles driven by the infeed and outfeed conveyors.

8. The apparatus of claim 4, wherein the differential drive mechanism includes condition responsive devices for detecting directly or indirectly a speed of the infeed and outfeed conveyors, a motor, and a drive control for driving the motor based on the speeds of the infeed and outfeed conveyors so as to move the output portion of the differential drive mechanism at a desired speed.

9. The apparatus of claim 4, wherein the differential drive mechanism drives the transport member mover at a speed equal to half the difference between the speeds of the infeed and outfeed conveyors.

10. The apparatus of claim 4, wherein the differential drive mechanism drives the transport member mover at a speed proportional to $as_1 - bs_2$, where $S_1$ is the speed of the infeed conveyor and $S_2$ is the speed of the outfeed conveyor, and a and b are adjustable parameters.

11. The apparatus of claim 1, further including a support structure, the infeed and outfeed conveyors being mounted to the support structure, and further including a track mounted to the support structure and located at least partially in the space between the infeed and outfeed conveyors, the transport member being movable along the track.

12. The apparatus of claim 11, further including guide members mounted to the support structure for guiding the transport member mover.

13. The apparatus of claim 11, wherein the guide members include one of pulleys or idler rollers.

14. The apparatus of claim 1, wherein the infeed and outfeed conveyors are configured to convey the articles in a first in, first out sequence.

15. The apparatus of claim 14, wherein the infeed and outfeed conveyors are configured to convey the articles in a single file orientation.

16. The apparatus of claim 15, wherein the infeed and outfeed conveyors are configured to convey the articles in a greater than single file orientation.

* * * * *